United States Patent Office 3,437,695
Patented Apr. 8, 1969

3,437,695
POLYMERIZATION
Carl W. Kruse, Bartlesville, Okla., assignor to Phillips Petroleum Company, a corporation of Delaware
No Drawing. Filed Oct. 5, 1964, Ser. No. 401,691
Int. Cl. C07c 43/20, 149/32; C08f 1/00
U.S. Cl. 260—613
10 Claims

ABSTRACT OF THE DISCLOSURE

Process for the polymerization of halomethyl-substituted aromatic compounds is provided wherein an oxidized charcoal is employed as polymerization catalyst.

---

This invention relates to a method for the formation of polymers from halomethyl-substituted aromatic compounds.

While various processes are known in the art for polymerizing halomethyl-substituted aromatic compounds, not all such known processes are desirable due to the conditions which are required to carry out the polymerization. For example, pyrolysis has been employed to polymerize p-methylbenzyl chloride but the high temperatures required result in reaction which is difficult to control. Other processes suffer from the disadvantage that the catalyst system employed is not easily recoverable.

It is therefore an object of this invention to provide an improved process for the polymerization of halomethyl-substituted aromatic compounds.

Another object of this invention is to provide a polymerization process which avoids the necessity of high temperatures and which employs a readily recoverable catalyst system.

Other aspects, objects and the several advantages of the invention will be readily apparent to those skilled in the art from the description and the appended claims.

According to the process of this invention, polymers are formed by contacting at least one halomethyl-substituted aromatic compound with an oxidized charcoal catalyst.

The polymers formed by this invention are homopolymers of a halomethyl-substituted aromatic compound, copolymers of at least two dissimilar halomethyl-substituted aromatic compounds, and copolymers of at least one halomethyl-substituted aromatic compound with aromatic compounds containing activating groups.

The halomethyl - substituted aromatic compounds which can be polymerized or copolymerized by the method of this invention are represented by the formulas:

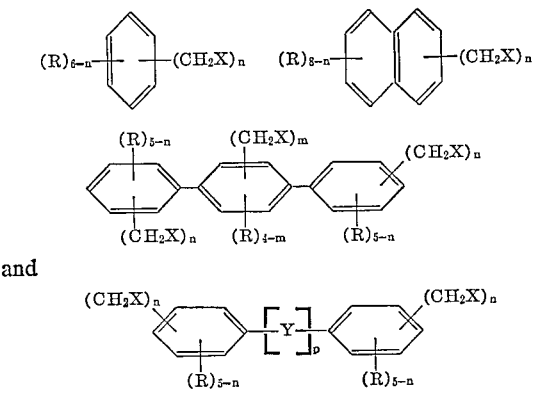

and wherein each X is selected from the group consisting of Cl, Br, and I, each R is selected from the group consisting of hydrogen, methyl and ethyl, n is a whole integer of from 1 to 3, inclusive, m is a whole integer of from 0 to 2, inclusive, p is a whole integer of from 0 to 1, inclusive, Y is selected from the group consisting of sulfur and oxygen, and wherein the total number of carbon atoms in one of said compounds generally does not exceed 24.

Some specific examples of compounds of the above general formula which can be homopolymerized or copolymerized according to the process of this invention are benzyl chloride,
p-methylbenzyl bromide,
bis-1,4-di(chloromethyl)benzene,
1,3,5-tri(chloromethyl)benzene,
3-ethyl-1,4-di(iodomethyl)benzene,
5,7-dimethyl-1,4-di(chloromethyl)naphthalene,
2,7-di(bromoethyl)naphthalene,
7-ethyl-1,4,6-tri(chloromethyl)naphthalene,
2-methyl-3,4,3′,2″,4″-penta(chloromethyl)-p-terphenyl,
2,2′-diethyl-4,4″-di(bromomethyl)-p-terphenyl
4,4′-di(chloromethyl)biphenyl,
2,4,2′,4′-tetra(bromomethyl)biphenyl,
4,4′-di(bromomethyl)diphenyl ether,
2,3,2′,3′-tetramethyl-4,4′ - di(chloromethyl)diphenyl sulfide and the like.

In forming copolymers by the method of this invention aromatic compounds containing activating groups can be employed. Such compounds include benzene and naphthalene which are substituted by at least one group, and not more than four groups selected from the group consisting of —OH, NH$_2$, Cl, Br, I, 1 to 4 carbon alkyls, 1 to 4 carbon alkoxy radicals, and aryloxy and alkaryloxy radicals containing from 6 to 10 carbon atoms. Such compounds include those having the formulas:

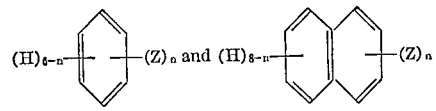

wherein n is a whole integer of from 1 to 4, inclusive, and wherein Z is selected from the group consisting of —OH, NH$_2$, Cl, Br, I, methyl, ethyl, propyl, butyl, methoxy, ethoxy, propoxy, butoxy, phenoxy and tolyloxy.

Specific compounds which contain activating groups and which can be employed include toluene, ethylbenzene, tert-butylylbenzene, 1,3,5-trimethylbenzene, 1,4-diethylbenzene, chlorobenzene, 1,4-dichlorobenzene, 1,2,3,-5 - tetrabromobenzene, 2,8 - diiodonaphthalene, 1,4 - dibromo - 7,8 - dimethylnaphthalene, phenol, anisole, aniline, naphthol, 1,4-diethoxybenzene, 1-ethoxy-3-chlorobenzene, diphenyl ether, bis(p-tolyl) ether, and the like.

The polymerizable compounds present will comprise a halomethyl-substituted aromatic compound and, if desired, added aromatic compound containing activating groups. However, the halomethyl-substituted aromatic compound will normally comprise at least 50 percent by weight of the mixture.

The present process can be carried out in the presence or absence of a diluent. Suitable diluents include paraffins, cycloparaffins and unsubstituted aromatic hydrocarbons, as for example n-hexane, isooctane, n-decane, cyclohexane, benzene, naphthalene and the like. The use of a diluent is advantageous in some cases, in that charcoal catalyst can be removed by filtration of the solution of polymer in diluent. The amount of diluent will generally range from 0 to 90 percent by weight of the reaction mixture.

The process of this invention is generally carried out at a temperature ranging from 25 to 200° C. The reaction time will generally range from a few minutes to 24 hours or longer depending on the particular halomethyl-substituted aromatic compound and the reaction temperature.

The charcoal catalyst which is used in the polymerization process of this invention is an oxidized activated charcoal. Prior to oxidation, the catalyst is a conventionally activated charcoal such as is prepared from such sources as bagasse, bones, coconut shells, cottonseed hulls, fruit pits, lignin, lignite, peat, petroleum coke, sawdust and the like. After initial carbonization, such as by heating in the absence of air at about 600° C., the charred material is then activated by such means as continued steam heating, treatment at elevated temperatures with $CO_2$, steam, chlorine, $SO_2$, etc.

The conventionally activated charcoals are then subjected to an oxidizing treatment to convert them to the active polymerization catalyst which is employed in the process of this invention. The oxidizing treatment is carried out by heating the activated charcoal in oxygen-containing gas to a temperature above 300° C., preferably to a temperature in the range of from 500 to 700° C. At these temperatures, the time of treatment will vary from about one second to about one hour, but will generally range from about 1 to 15 minutes. Some minor loss of carbon usually takes place during the oxidation. If desired, the air used for the oxidizing treatment can be diluted with inert gases to better control the treatment and to minimize combustion losses.

The amount of catalyst present in the polymerization zone will generally range from about 0.01 to 5 weight percent based on the halomethyl-substituted aromatic compound present, preferably from 0.25 to 1.5 weight percent on the same basis.

The following specific examples are intended to illustrate the advantages of the process of this invention, but are not intended to unduly limit the invention.

EXAMPLE I

A run was carried out in which benzyl chloride was converted to polymers by means of a charcoal catalyst. The oxidized charcoal catalyst used in these runs was prepared by placing a sample of a petroleum base coke (Darco) in a quartz tray which had been preheated to 650 to 700° C. in a muffle furnace. The tray was then placed in a muffle furnace operating at 650 to 700° C., and the tray was rapidly shaken while blowing air over the glowing charcoal. After about 5 minutes of such treatment, the tray was removed and the charcoal was allowed to cool.

In the reaction vessel equipped with a heater were placed 26.5 grams of benzyl chloride and 0.3 gram of the oxidized charcoal. The heater was turned on, and the temperature quickly rose to 200° C., indicating an exothermic reaction was taking place. The evolution of HCl was noted. In a few minutes the material had turned to a thick syrup-like substance having a deep greenish blue color. On cooling, the material solidified.

The polymer from the above step was found to be benzene soluble and only a small amount of polymer was precipitated by the addition of acetone. Precipitation was effected by pouring the benzene-acetone-polymer solution into methyl alcohol. A nearly white product precipitated which had a melting point of 83–101° C. The infrared spectrum of this polymer was very similar to the spectrum of the polymer shown in the Journal of Polymer Science, 15, 503–514 (1955).

EXAMPLE II

In another run, 1,4-bis(chloromethyl)benzene and diphenyl ether were reacted together by the process of this invention.

In this run, 4.06 grams each of diphenyl ether and 1,4-bis(chloromethyl)benzene were heated together in a test tube in an oil bath operated at 190° C. A few granules of oxidized charcoal from Example I were added to the mixture. There was a vigorous evolution of HCl gas for about 5 minutes and the liquid became more viscous. Suddenly the liquid became too viscous to release the gas rapidly, and a foamy material was pushed out of the tube. The polymer was recovered by scraping the tube yielding 5.9 grams of polymer. Refluxing xylene dissolved only a small portion of this polymer.

EXAMPLE III

In another run, 2.9 grams of anisole (0.0268 mol) and 4.7 grams (0.0268 mol) of 1,4-bis(chloromethyl)benzene were heated together at 150° C. with a few granules of the oxidized charcoal of Example I. After vigorous gas evolution for 5 minutes, the solution became thick and finally foamed from the tube. The weight of recovered polymer was 5.4 grams.

Reasonable variations and modifications of this invention can be made, or followed, in view of the foregoing without departing from the spirit or scope thereof.

I claim:
1. In a process for forming a polymer of a halomethyl-substituted aromatic compound selected from those of the formulas

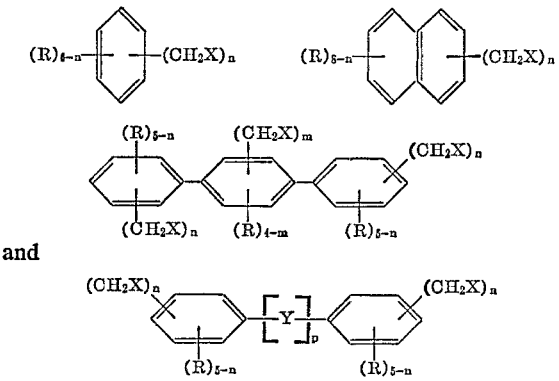

and wherein each X is selected from the group consisting of chlorine, bromine and iodine, each R is selected from the group consisting of hydrogen, methyl and ethyl, $n$ is a whole integer of from 1 to 3, inclusive, $m$ is a whole integer of from 0 to 2, inclusive, $p$ is a whole integer of from 0 to 1, inclusive, Y is selected from the group consisting of sulfur and oxygen, and wherein the total number of carbon atoms in one of said compounds generally does not exceed 24, and a compound selected from the group consisting of compounds of the formulas

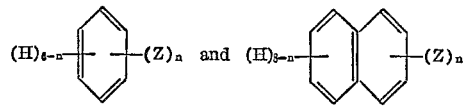

wherein $n$ is a whole integer of from 1 to 4, inclusive, and wherein Z is selected from the group consisting of —OH, $NH_2$, Cl, Br, I, methyl, ethyl, propyl, butyl, methoxy, ethoxy, propoxy and butoxy, which comprises contacting at least one of each of said groups of compounds under polymerization conditions, the improvement which comprises carrying out the process in the presence of an oxidized charcoal catalyst.

2. The process of claim 1 wherein the process is carried out in the presence of a diluent and at a temperature within the range of 25° to 200° C.

3. The process of claim 1 wherein said catalyst is present in an amount in the range of from about 0.01 to 5 weight percent based on the halomethyl-substituted aromatic compound present.

4. The process of claim 1 wherein said polymer is formed from a mixture of 1,4-bis(chloromethyl)benzene and diphenyl ether.

5. The process of claim 1 wherein said polymer is formed from a mixture of anisole and 1,4-bis(chloromethyl)benzene.

6. In the process for forming polymers of at least one halomethyl-substituted aromatic compound selected from those of the formulas:

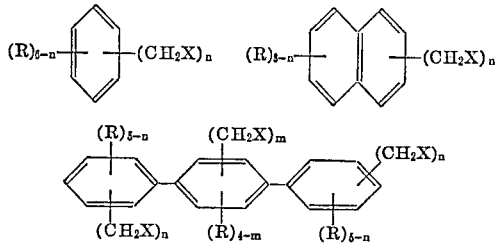

and

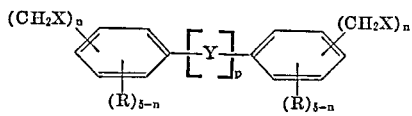

wherein each X is selected from the group consisting of Cl, Br, and I, each R is selected from the group consisting of hydrogen, methyl and ethyl, $n$ is a whole integer of from 1 to 3, inclusive, and at least one R being hydrogen, $m$ is a whole integer of from 0 to 2, inclusive, $p$ is a whole integer of from 0 to 1, inclusive, Y is selected from the group consisting of sulfur and oxygen, and wherein the total number of carbon atoms in one of said compounds generally does not exceed 24 by contacting same under polymerization conditions in the presence of a polymerization catalyst, the improvement which comprises utilizing an oxidized charcoal as the catalyst for the polymerization.

7. The process of claim 6 wherein said halomethyl-substituted aromatic compound is benzyl chloride.

8. The process of claim 1 wherein the process is carried out in the presence of a diluent and at a temperature within the range of 25° to 200° C.

9. The process of claim 1 wherein said catalyst is present in an amount in the range of from about 0.01 to 5 weight percent based on the halomethyl-substituted aromatic compound present.

10. The process of claim 1 wherein a mixture of at least two of said halomethyl-substituted compounds is employed.

References Cited

UNITED STATES PATENTS

| 2,299,593 | 10/1942 | Roberts et al. | 260—2.5 XR |
| 2,911,380 | 11/1959 | Doedens | 260—2.5 |
| 3,054,773 | 9/1962 | Wilgus | 260—6.3 XR |
| 3,189,558 | 6/1965 | Doedens et al. | 260—613 XR |

BERNARD HELFIN, Primary Examiner.

U.S. Cl. X.R.

260—47, 79.7, 91.1, 91.5, 578, 609, 619, 649, 668